(12) United States Patent
Iwakura

(10) Patent No.: US 10,012,199 B2
(45) Date of Patent: Jul. 3, 2018

(54) POWER CONVERSION DEVICE

(71) Applicant: SHINDENGEN ELECTRIC MANUFACTURING CO., LTD., Tokyo (JP)

(72) Inventor: Tokihiko Iwakura, Hanno (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/312,244

(22) PCT Filed: May 30, 2014

(86) PCT No.: PCT/JP2014/064432
§ 371 (c)(1),
(2) Date: Nov. 18, 2016

(87) PCT Pub. No.: WO2015/181954
PCT Pub. Date: Dec. 3, 2015

(65) Prior Publication Data
US 2017/0107962 A1 Apr. 20, 2017

(51) Int. Cl.
*F02N 11/04* (2006.01)
*F02N 11/08* (2006.01)
(Continued)

(52) U.S. Cl.
CPC .......... *F02N 11/04* (2013.01); *F02N 11/0862* (2013.01); *H02J 7/1492* (2013.01); *H02M 7/064* (2013.01)

(58) Field of Classification Search
CPC .... F02N 11/04; F02N 11/0862; H02J 7/1492; H02M 7/064; H02P 9/10
See application file for complete search history.

(56) References Cited

U.S. PATENT DOCUMENTS 5,323,102 A    6/1994   Torii et al.
7,436,154 B2 * 10/2008  Asada ................. H02P 9/10
                                                    322/24

FOREIGN PATENT DOCUMENTS

JP    11-215729      8/1999
JP    2010-057354    3/2010
(Continued)

OTHER PUBLICATIONS

International Search Report for PCT/JP2014/064432, dated Jul. 15, 2014, 2 pages.
(Continued)

*Primary Examiner* — Rexford Barnie
*Assistant Examiner* — Elim Ortiz
(74) *Attorney, Agent, or Firm* — Nixon & Vanderhye P.C.

(57) ABSTRACT

Provided is a power conversion device that can suppress a surge to be generated when a load, such as a battery, is disconnected from an output of an AC generator. A rectifier circuit connected between an output portion of the AC generator and a first load rectifies the output of the AC generator and supplies the rectified output to the first load. A switch circuit connected between the output portion of the AC generator and the second load rectifies the output of the AC generator and supplies the rectified output to the second load, on condition that a drive signal is in a first signal state indicating permission of a power supply from the AC generator to the second load. Additionally, the switch circuit transitions from a conductive state to a non-conductive state in response to the output of the AC generator, on condition that the drive signal is in a second signal state indicating prohibition of the power supply from the AC generator to the second load. A driver circuit generates the drive signal and supplies the generated drive signal to a control terminal of the switch circuit.

4 Claims, 4 Drawing Sheets

(51) Int. Cl.
*H02J 7/14* (2006.01)
*H02M 7/06* (2006.01)

(56) References Cited

FOREIGN PATENT DOCUMENTS

JP      2012-166684     9/2012
JP      2012-167600     9/2012

OTHER PUBLICATIONS

Written Opinion of the ISA for PCT/JP2014/064432, dated Jul. 15, 2014, 4 pages.
Extended European Search Report dated Feb. 22, 2018 in European Application No. 14893534.9 (5 pages).

* cited by examiner

POWER CONVERSION DEVICE

This application is the U.S. national phase of International Application No. PCT/JP2014/064432 filed 30 May 2014, which designated the U.S., the entire content of which is hereby incorporated by reference.

TECHNICAL FIELD

The present invention relates to a power conversion device.

BACKGROUND ART

Conventionally, there are power conversion devices used as devices for charging a battery that serves as a power supply to an electronic control unit (ECU: Electronic Control Unit), such as an engine controller. This type of power conversion device rectifies an output of an AC generator driven by an engine, thereby generating a DC voltage to charge the battery.

According to power conversion devices of related art, a battery is discharged by dark current, such as leakage current or standby current flowing through the electronic control unit during a period in which the AC generator is not generating power, so that a battery voltage decreases in some cases. Patent Document 1 discloses a technique for blocking such dark current.

FIG. 5 is a diagram for explaining a conventional device disclosed in Patent Document 1. According to this conventional device, when an AC generator 201 is generating power, an electronic control unit (ECU) 205 turns on a battery relay 203. In this case, an AC output of the AC generator 201 is converted into a desired DC power by a regulator 202 that is a power conversion device. This DC power is supplied to a battery 204 through a battery relay 203, so that the battery 204 is charged. Additionally, the regulator 202 also provides power supply to the electronic control unit 205.

On the other hand, when the AC generator 201 is not generating power, that is, when the battery 204 is not in the charging state, the electronic control unit 205 turns off the battery relay 203. Thereby, the battery 204 is electrically disconnected from the electronic control unit 205, so that dark current flowing from the battery 204 to the electronic control unit 205 is cut off.

In addition to the above-described conventional device, in a system having a main switch such as a key switch, a configuration may be such that dark current is cut off by the main switch.

CITATION LIST

Patent Document 1: Japanese Patent Laid-open Publication No. 2012-166684

DISCLOSURE OF THE INVENTION

Problems to be Solved by the Invention

In systems with no main switch, such as an outboard motor for a small boat, depending on a usage pattern, there is a possibility that even during power generation of the AC generator driven by an engine (i.e., during charging of the battery), a load connected to a battery will be increased, thereby causing a battery voltage drop to occur. In the conventional example of FIG. 5, if the battery voltage of the battery 204 is decreased by an increase in load (not shown), the power generated by the AC generator 201 is consumed to charge the battery 204. Consequently, there is a possibility that it will become difficult to ensure the power supply to the electronic control unit 205. If it is unable to secure the power supply to the electronic control unit 205, it is unable to cause the engine of the above system to operate.

Therefore, not only when the AC generator 201 is not generating power (i.e., while the battery is not being charged 204), but also during charging of the battery 204, there are some cases where it becomes necessary to electrically disconnect the battery 204 from the output of the AC generator 201 and thereby preferentially supply the power generated by the AC generator 201 to the electronic control unit 205.

However, according to the above-described related art, there is a problem such that if the charging current of the battery 204 is cut off when the battery 204 is disconnected from the output of the AC generator 201 during the charging of the battery 204, a surge is generated by inductive component of the line for supplying the charging current.

For this reason, one aspect of the present invention has an object to provide a power conversion device that can suppress a surge to be generated when a load, such as a battery, is disconnected from an output of an AC generator.

Means for Solving the Problems

One aspect of the present invention proposes the following.

According to one aspect of the present invention, proposed is a power conversion device configured to convert an output of an AC generator into a desired DC power and supply the desired DC power to a first load and a second load, the power conversion device including: a rectifier circuit connected between an output portion of the AC generator and the first load, the rectifier circuit being configured to rectify the output of the AC generator and supply the rectified output to the first load; a switch circuit connected between the output portion of the AC generator and the second load, the switch circuit being configured to rectify the output of the AC generator and supply the rectified output to the second load, on condition that a drive signal is in a first signal state indicating permission of a power supply from the AC generator to the second load, and transition from a conductive state to a non-conductive state in response to the output of the AC generator, on condition that the drive signal is in a second signal state indicating prohibition of the power supply from the AC generator to the second load; and a driver circuit configured to generate the drive signal and supply the generated drive signal to a control terminal of the switch circuit.

According to one aspect of the present invention, proposed is the power conversion device, wherein the switch circuit is configured to transition from the conductive state to the non-conductive state in a period in which the output of the AC generator is reverse in polarity to that at the time of being supplied to the second load.

According to one aspect of the present invention, proposed is the power conversion device, wherein the switch circuit is a thyristor connected between the AC generator and the second load so that forward current flows from the AC generator towards the second load.

According to one aspect of the present invention, proposed is the power conversion device, wherein the first load is an electronic control unit configured to control rotation of an engine, and the second load is a battery configured to provide a power supply to the electronic control unit.

According to one aspect of the present invention, proposed is the power conversion device, wherein the rectifier circuit includes: a first diode having an anode connected to the output portion of the AC generator and a cathode connected to the first load; a second diode having a cathode connected to the output portion of the AC generator and an anode connected to a common terminal; and a thyristor having an anode connected to the output portion of the AC generator and a cathode connected to the common terminal, the thyristor being configured to become conductive in response to a predetermined control signal.

Effects of the Invention

According to one aspect of the present invention, it is possible to suppress a surge to be generated when a load, such as a battery, is disconnected from an output of an AC generator.

MODE FOR CARRYING OUT THE INVENTION

Hereinafter, embodiments of the present invention will be described with reference to the drawings.

Here, components in these embodiments may be appropriately replaced with existing components or the like, and various variations including combinations with other existing components may be made. Accordingly, the description of the present embodiments is not intended to limit the subject matter of the claimed inventions.

First Embodiment

Figure 1:
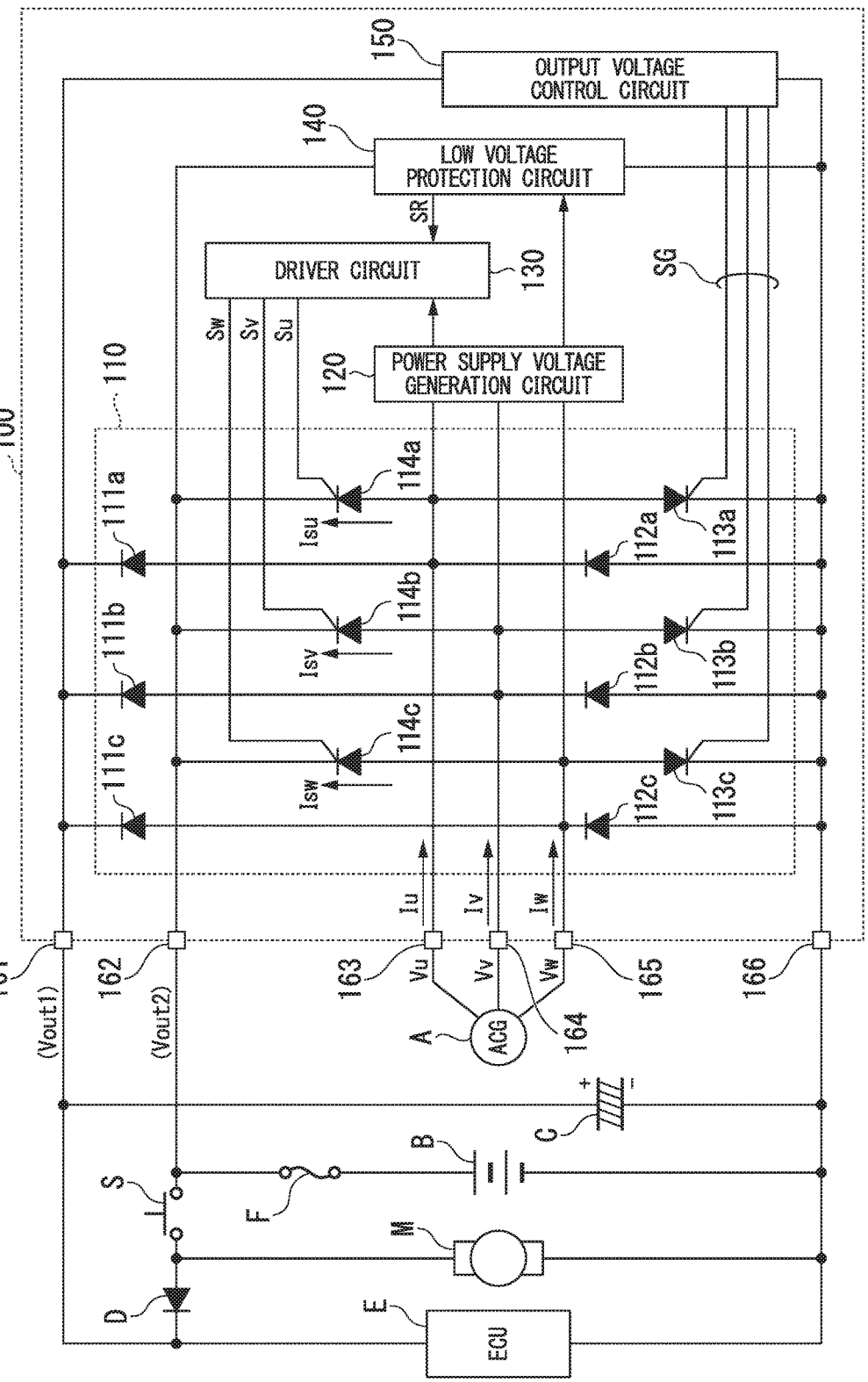
FIG. 1 is a circuit diagram showing a configuration example of a power conversion device according to a first embodiment of the present invention and its application example.

FIG. 1 shows a configuration example of a power conversion device 100 according to a first embodiment of the present invention and its application example. The power conversion device 100 according to the present embodiment is configured to rectify an AC output of an AC generator (ACG) A mounted on a vehicle to a desired DC, and supply the desired DC to an electronic control unit (ECU) E configured to control rotation of an engine of the vehicle and to a battery B configured to provide power supply to the electronic control unit E. In other words, the power conversion device 100 functions as a power supply that provides power supply to the electronic control unit E, as well as a charging device that charges the battery B.

In the present embodiment, the electronic control unit E constitutes a first load of the power conversion device 100, while the battery B constitutes a second load of the power conversion device 100. Not limited to this example, however, the first load and the second load to be targets of the power supply from the power conversion device 100 are optional. Additionally, in the present embodiments, the AC generator A is assumed to generate 3-phase alternating current of a U-phase, a V-phase, and a W phase, but is not limited to this example.

The power conversion device 100 has, as connection terminals, output terminals 161, 162, input terminals 163, 164, 165, and a common terminal 166. A power terminal (not shown) of the electronic control unit E is connected to the output terminal 161, while a ground terminal (not shown) of the electronic control unit E is connected to the common terminal 166. An electrolytic capacitor C for smoothing is connected between the output terminal 161 and the common terminal 166. A positive electrode of the battery B is connected to the output terminal 162 through a fuse F, while a negative electrode of the battery B is connected to the common terminal 166.

Additionally, one end of a current path of a starter switch S is connected to the output terminal 162, while a starter motor M is connected between the other end of the current path of the starter switch S and the common terminal 166. When the starter switch S is closed, power is supplied from the battery B to the starter motor M so that a starter motor M rotates, thus cranking the engine. An anode of the diode D is connected to the other end of the current path of the starter switch S, while a cathode of the diode D is connected to a power supply terminal (not shown) of the electronic control unit E. When the starter switch S is closed, the power is supplied from the battery B to the electronic control unit E through the diode D, so that the electronic control unit E becomes operable, thus performing a predetermined control.

Here, in the present embodiment, the diode D provides power supply to the electronic control unit E when the battery voltage of the battery B is not decreased. As described later, however, in the present embodiment, even when the battery voltage of the battery B is decreased, a power supply to the electronic control unit E is ensured by an output voltage Vout1 of the power conversion device 100.

Output portions of a U-phase, a V-phase, and a W-phase of the AC generator A are connected respectively to the input terminals 163, 164, and 165. A rotor shaft (not shown) of the AC generator A is connected to a crank shaft of the engine on the vehicle side via a power transmission mechanism. The AC generator A is driven by the engine to generate three-phase AC, and supplies the AC outputs of the U-phase, the V-phase, and the W-phase respectively to the input terminals 163, 164, and 165 of the power conversion device 100.

Next, the detailed configuration of the power conversion device 100 will be described.

As shown in FIG. 1, the power conversion device 100 includes a full-wave rectifier circuit 110, a power supply voltage generation circuit 120, a driver circuit 130, a low voltage protection circuit 140, and an output voltage control circuit 150. Among them, the full-wave rectifier circuit 110 is configured to full-wave rectify the AC outputs supplied from the AC generator A to the input terminal 163, 164, and 165. The full-wave rectifier circuit 110 includes diodes 111a, 111b, 111c, diodes 112a, 112b, 112c, thyristors 113a, 113b, 113c, and thyristors 114a, 114b, 114c.

The diodes 111a, 111b, and 111c are connected between the output portion of the AC generator A and the electronic control unit, and function as a rectifier circuit configured to half-wave rectify the AC outputs on a positive side of the respective phases of the AC generator A and supply the rectified outputs to the electronic control unit E. Anodes of the diodes 111a, 111b, and 111c are connected respectively to the output portions of the W-phase, the U-phase, and the V phase of the AC generator A respectively through the input terminals 163, 164, and 165. Additionally, each of cathodes of the diodes 111a, 111b, and 111c is connected commonly to the output terminal 161, and is connected to the power supply terminal (not shown) of the electronic control unit E through the output terminal 161.

The diodes 112a, 112b, and 112c are configured to half-wave rectify the AC outputs on a negative side of the respective phases of the AC generator A and supply the rectified outputs to the common terminal 166. Cathodes of the diodes 112a, 112b, and 112c are connected respectively to the output portions of the W-phase, the U-phase, and the V phase of the AC generator A respectively through the input terminals 163, 164, and 165. Additionally, each of anodes of the diodes 112a, 112b, and 112c is connected commonly to the common terminal 166.

The AC outputs of the AC generator A are full-wave rectified by the above-described diodes 111a, 111b, 111c and the diodes 112a, 112b, 112c, so that the DC output voltage Vout1 is generated between the output terminal 161 and the common terminal 166.

The thyristors 113a, 113b, and 113c are configured to become conductive in response to a predetermined control signal SG supplied from the output voltage control circuit 150, thus short-circuiting between the common terminal 166 and the input terminals 163, 164, and 165 supplied with the AC outputs of the AC generator A, so that the full-wave rectified output voltage Vout1 becomes a desired voltage by the above-described diodes 111a, 111b, 111c and the diodes 112a, 112b, 112c. Anodes of the thyristors 113a, 113b, and 113c are connected respectively to the input terminals 163, 164, and 165, and are connected respectively to the output portions of the respective phases of the AC generator A through the input terminals 163, 164, and 165. Additionally, cathodes of the thyristors 113a, 113b, and 113c are connected to the common terminal 166.

The thyristors 114a, 114b, and 114c are connected between the AC generator A and the battery B so that forward current flows from the AC generator A toward the battery B (second load). Specifically, anodes of the thyristors 114a, 114b, and 114c are connected respectively to the input terminals 163, 164, and 165. Additionally, cathodes of the thyristors 114a, 114b, and 114c are connected to the output terminal 162, and are connected to a positive electrode of the battery B through the output terminal 162 and the fuse F.

The thyristors 114a, 114b, and 114c constitute a switch circuit to function as a rectifier or current breaker in accordance with signal states (e.g., high level or low level) of gate drive signals Su, Sv, and Sw supplied from the driver circuit 130. In other words, the thyristors 114a, 114b, and 114c rectify the outputs of the AC generator A to generate an output voltage Vout2, on condition that the gate drive signals Su, Sv, and Sw are in a first signal state indicating permission of the power supply from the AC generator A to the battery B. In the present embodiment, the first signal state represents a signal level (e.g., high level) at which the thyristors 114a, 114b, and 114c are turned on. The output voltage Vout2 is supplied from the output terminal 162 to the battery B through the fuse F.

Additionally, on condition that the above-described gate drive signal Su, Sv, and Sw are in a second signal state indicating prohibition of the power supply from the AC generator A to the battery B, the thyristors 114a, 114b, and 114c, in response to the outputs of the AC generator A, transition from the conductive state to a non-conductive state, thus cutting off the current flowing from the AC generator A to the battery B. In other words, the second signal state represents a signal level (e.g., low level) at which the thyristors 114a, 114b, and 114c are turned off.

Here, the second signal state may be optional as long as the thyristors 114a, 114b, and 114c can be turned off. For example, the second signal state may be a no-signal state (signal state in which gate currents of the thyristors become zero).

Additionally, in place of the thyristors 114a, 114b, and 114c, any switch may be used as long as the switch functions as a rectifier or current breaker in accordance with the signal states of the gate drive signals Su, Sv, and Sw supplied from the driver circuit 130.

The power supply voltage generation circuit 120 is configured to generate respective powers for the driver circuit 130 and the low voltage protection circuit 140. In the present embodiment, the power supply voltage generation circuit 120 full-wave rectifies the AC outputs of the AC generator A to generate the respective powers for the driver circuit 130 and the low voltage protection circuit 140.

The driver circuit 130 is configured to generate gate drive signals Su, Sv, and Sw for controlling turn-on and turn-off of the thyristors 114a, 114b, and 114c constituting the full-wave rectifier circuit 110, and supply the generated gate drive signals to respective control terminals (gate terminals) of the thyristors 114a, 114b, and 114c.

The low voltage protection circuit 140 is configured to detect the output voltage Vout2 supplied from the diodes 111a, 111b, and 111c to the electronic control unit E through the output terminal 162, and output to the driver circuit 130, a signal SR indicating that voltage state. In the present embodiment, the low voltage protection circuit 140 outputs to the driver circuit 130, a signal SR indicating whether or not the output voltage Vout2 is equal to or less than a predetermined threshold value VTH.

The above-described predetermined threshold value VTH is a value that defines a condition in a case where the driver circuit 130 performs the operation for prohibiting the power supply from the AC generator A to the battery B. If the output voltage Vout2 is equal to or less than the above-described predetermined threshold VTH, the driver circuit 130 performs the operation for prohibiting the power supply from the AC generator A to the battery B. In the present embodiment, if the battery voltage of battery B is lowered to the predetermined threshold VTH or less, and the output voltage Vout2 is lowered to such an extent that there arises a risk that the output voltage Vout2 falls below the lower limit value of the power supply voltage of the electronic control unit E, the driver circuit 130 turns off the thyristors 114a, 114b, and 114c, thereby prohibiting the power supply from the AC generator A to the battery B. Here, the predetermined threshold value VTH can be set arbitrarily as long as it represents a value that defines the condition for prohibiting the power supply from the AC generator A to the battery B. In other words, in what cases the power supply from the AC generator A to the battery B is to be prohibited can be arranged arbitrarily in accordance with an application target of the power conversion device 100.

In the present embodiment, in a case where the signal SR indicates that the output voltage Vout2 is not equal to or less than the predetermined threshold value VTH (i.e., exceeds the predetermined threshold value VTH), the driver circuit 130 outputs the gate drive signals Su, Sv, and Sw in the first signal state in which the thyristors 114a, 114b, and 114c are turned on. In contrast, in a case where the signal SR indicates that the output voltage Vout2 is equal to or less than the predetermined threshold value VTH, the driver circuit 130 outputs the gate drive signals Su, Sv, and Sw in the second signal state in which the thyristors 114a, 114b, and 114c are turned off.

The output voltage control circuit 150 is configured to adjust the output voltages Vu, Vv, and Vw of the respective phases of the AC generator A by controlling the conduction (on/off control) of the thyristors 113a, 113b, and 113c so that the output voltage Vout1 supplied from the diodes 111a, 111b, and 111c to the electronic control unit E becomes a desired voltage. In the present embodiment, since both the output voltage Vout1 and the output voltage Vout2 are voltages generated by rectifying the AC outputs of the AC generator A, the AC outputs of the AC generator A are adjusted so that the output voltage Vout1 becomes a desired voltage. As a result, the output voltage Vout2 also becomes a desired voltage.

Next, operation of the system shown in FIG. 1 to which the power conversion device 100 according to the first embodiment is applied will be described.

Hereinafter, focusing on an output voltage Vu of the U-phase and a current Iu of the U-phase of the AC generator A, the operation of the power conversion device 100 will be described. Here, the same applies to the V-phase and the W-phase.

(A) Standby Operation

In a case where the starter switch S has not been turned on, and the AC generator A is not generating power, the power conversion device 100 is in a standby state, and does not perform the power conversion operation. In this case, the thyristors 114a, 114b, and 114c enter the turn-off state. In this state, on the current path of the dark current flowing from the battery B toward the electronic control unit E through the voltage conversion device 100, the fuse F, the output terminal 162, the thyristors 114a, 114b, 114c, the diodes 111a, 111b, 111c, and the output terminal 161 are present. On the above-described current path, the dark current flowing from the battery B toward the electronic control unit E becomes the reverse currents of the thyristors 114a, 114b, and 114c, and therefore are cut off by the thyristors 114a, 114b, and 114c. In other words, during the standby, the dark current flowing from the battery B through the power conversion device 100 to the electronic control unit E is not generated. Therefore, the battery B is hardly discharged by the dark current of the electronic control unit E.

(B) Operation at Start of Engine

When the starter switch S is turned on, the starter motor M starts, thus causing the engine (not shown) to operate. When the engine operates, the AC generator A driven by the engine initiates power generation, thus generating the respective AC outputs of the U-phase, the V-phase, and the W-phase (output voltages Vu, Vv, Vw, and output currents Iu, Iv, Iw). The AC outputs of the AC generator A are input through the input terminals 163, 164, and 165 to the power conversion device 100.

In the power conversion device 100, when the AC outputs of the respective phases of the AC generator A are input, the full-wave rectifier circuit 110 full-wave rectifies the AC outputs of the AC generator A to generate the output voltages Vout1 and Vout2. The power supply voltage generation circuit 120 full-wave rectifies the AC outputs of the AC generator A to generate a power supply to the driver circuit 130 and a power supply to the low voltage protection circuit 140, thereby causing the driver circuit 130 and the low voltage protection circuit 140 to operate.

The low voltage protection circuit 140 detects the output voltage Vout2 to be supplied to the battery B, and outputs to the driver circuit 130 a signal SR indicating whether or not the output voltage Vout2 is equal to or less than the predetermined threshold value VTH. Here, at the time of start-up, since a large amount of current is supplied from the battery B to the starter motor M, the load of the battery B increases. Thereby, a case where the battery voltage is decreased is likely to occur. In this case, when the output voltage Vout2 becomes the predetermined threshold value VTH or less along with the decrease in battery voltage, the low voltage protection circuit 140 outputs a signal SR indicating that the output voltage Vout2 has become the predetermined threshold value VTH or less. In response to this signal SR, the driver circuit 130 outputs to the gate terminals of the thyristors 114a, 114b, and 114c, gate drive signals Su, Sv, and Sw in the second signal state for turning off the thyristors 114a, 114 b, and 114c. In the state of receiving the gate drive signals Su, Sv, and Sw at the gate terminals, the thyristors 114a, 114b, and 114c are turned off when the AC outputs of the AC generator A supplied to the anodes thereof become negative in polarity.

When the thyristors 114a, 114b, and 114c are turned off, the battery B is electrically disconnected from the AC generator A. Thus, the AC outputs of the AC generator A are no longer supplied to the battery B side. Then, the AC outputs of the AC generator A are preferentially supplied to the electronic control unit E through the diodes 111a, 111b, and 111c. For this reason, even if the battery voltage of battery B is decreased at the start-up of the engine, the power supply to the control power unit E can be secured, thereby enabling the engine to stably operate under the control of the electronic control unit E.

Here, if the remaining capacity of the battery B is sufficient, and the decrease in battery voltage is small, the power supply is provided from the battery B to the electronic control unit E through the diode D immediately after the starter switch S is turned on. Accordingly, even in the period where the amount of power generated by the AC generator A is small, which is immediately after the starter switch S is turned on, it is possible to promptly ensure the power supply to the electronic control unit E, enabling the electronic control unit E to quickly enter the operable state.

(C) Stationary Operation

In a state where the engine operates, and the AC generator A is generating power, the diodes 111a, 111b, 111c and the diodes 112a, 112b, 112c full-wave rectify the AC outputs of the AC generator A, thereby causing the output voltage Vout1 to be generated between the output terminal 161 and the common terminal 166. The output voltage Vout1 is supplied to the electronic control unit E. Similarly, thyristors 114a, 114b, 114c and the diodes 112a, 112b, 112c full-wave rectify the outputs of the AC generator A, thereby causing the output voltage Vout2 to be generated between the output terminal 162 and the common terminal 166. The output voltage Vout2 is supplied to the battery B. At this time, the thyristors 114a, 114b, and 114c rectify the outputs of the AC generator A on condition that the gate drive signals Su, Sv, and Sw are in the first signal state (signal state for turning on the thyristors).

In parallel with the full-wave rectification by the diodes 111a, 111b, 111c, the diodes 112a, 112b, 112c, and the thyristors 114a, 114b, 114c, the output voltage control circuit 150 controls the conduction of the thyristors 113a, 113*b*, 113*c* (on/off control), so that the output voltage Vout1 supplied to the electronic control unit E becomes a desired voltage. As a result, the output voltage Vout2 for charging the battery B becomes a desired voltage.

Here, consideration is made with respect to, for example, a case where the load of the battery B is increased, and the battery voltage is decreased, for some reason such that a lighting device (not shown) added as the load of the battery B is turned on. In this case, the output voltage Vout2 is decreased along with the decrease in battery voltage of the battery B. Then, when the output voltage Vout2 becomes the predetermined threshold value VTH or less, the low voltage protection circuit 140 detects the decrease in output voltage Vout2, and outputs a signal SR indicating that fact. Based on this signal SR, the driver circuit 130 sets the gate drive signals Su, Sv, and Sw to the second signal state (signal state for turning off the thyristors).

If the gate drive signals Su, Sv, and Sw enter the second signal state, the thyristors 114*a*, 114*b*, and 114*c* are turned off at the time the outputs of the AC generator A become negative in voltage. In other words, on condition that the gate drive signals Su, Sv, and Sw are in the second signal state, the thyristors 114*a*, 114*b*, and 114*c* transition from the conductive state to the non-conductive state in response to the negative voltage of the outputs of the AC generator A. Thereafter, as long as the gate drive signal Su, Sv, and Sw do not return to the first signal state, the thyristors 114*a*, 114*b*, and 114*c* maintain the non-conductive state. Thereby, the battery B is electrically disconnected from the outputs of the AC generator A, so that the AC generator A and the battery B are electrically insulated from each other. As a result, the power supply from the AC generator A to the battery B is prohibited, so that the power generated by the AC generator A is preferentially supplied to the electronic control unit E.

Therefore, even if the load of battery B is increased, and the battery voltage is decreased, the power generated by the AC generator A is no longer consumed to charge the battery B, thereby making it possible to stably ensure the power supply to the electronic control unit E. For this reason, it becomes possible to stably control the operation of the engine by the electronic control unit E without being affected by the decrease in battery voltage due to the increase in load of the battery B.

Additionally, as described next, in the present embodiment, when the thyristors 114*a*, 114*b*, 114*c* are turned off, and the battery B is electrically disconnected from the outputs of the AC generator A, the current flowing in each thyristor becomes substantially zero, thereby suppressing a surge from being generated.

Figure 2:
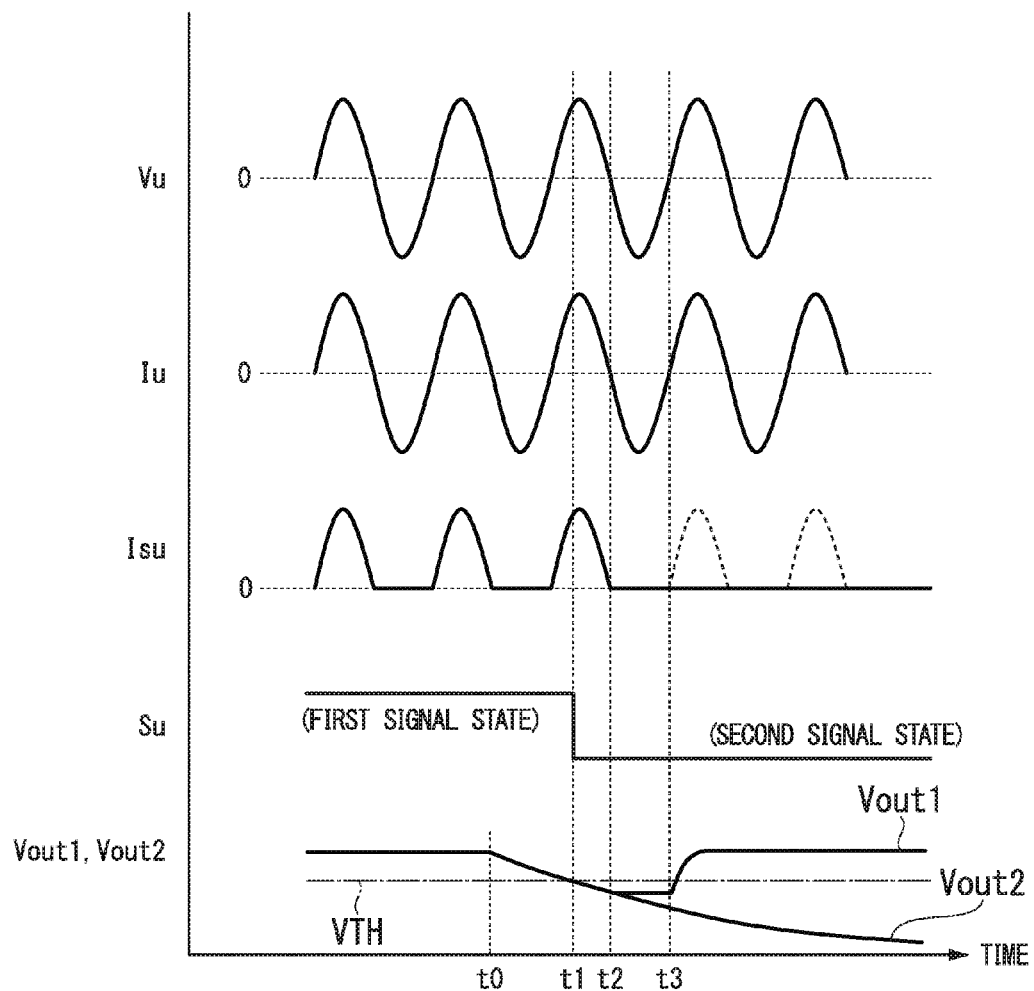
FIG. 2 is a waveform diagram for explaining operation of the power conversion device according to the first embodiment of the present invention.

FIG. 2 is a waveform diagram for explaining the operation of the power conversion device 100 according to the first embodiment of the present invention, and is a diagram for explaining mechanism for suppressing the surge.

The stationary operation of the power conversion device 100 represented by the waveform diagram of FIG. 2 will be described. In the example of FIG. 2, by the battery voltage of the battery B being decreased at time t0, the output voltages Vout1 and Vout2 begin to decrease together at time t0, and the output voltages Vout1 and Vout2 reach the predetermined threshold value VTH at time t1. As described above, when the output voltage Vout2 becomes the predetermined threshold value VTH or less, the low voltage protection circuit 140 detects the decrease in output voltage Vout2, and outputs to the driver circuit 130 a signal SR indicating that fact. In response to the signal SR output from the low voltage protection circuit 140, the driver circuit 130 sets, at time t1, the gate driving signals Su, Sv, and Sw for driving the thyristors 114*a*, 114*b*, and 114*c* to the second signal state. Thereafter, when the output voltage Vu becomes negative in polarity at time t2, the thyristors 114*a*, 114*b*, and 114*c* are turned off, so that the battery B is electrically disconnected from the outputs of the AC generator A. As a result, the decrease in output voltage Vout1 stops at the time t2. Thereafter, the output voltage Vout1 increases at the time t3 along with an increase in output voltage Vu, and is restored to the original voltage. Here, in the example of FIG. 2, in the period from time t2 to time t3, although the output voltage Vout1 is decreased to a voltage below the predetermined threshold value VTH, the predetermined threshold value VTH is properly set so that even if the output voltage Vout1 is decreased in this manner, the output voltage Vout1 exceeds the lower limit value of the power supply voltage of the electronic control unit E.

In the above-described stationary operation, the timing at which the driver circuit 130 sets the gate drive signals Su, Sv, and Sw to the second signal state in order to turn off the thyristors 114*a*, 114*b*, and 114*c* is optional. For example, as shown in FIG. 2, in order to turn off the thyristors 114*a*, 114*b*, and 114*c*, the driver circuit 130 sets the gate drive signals Su, Sv, and Sw to the second signal state from the first signal state at arbitrary time t1 at which the output voltage Vout2 becomes the predetermined threshold value VTH.

On condition that the gate drive signals Su, Sv, and Sw are in the second signal state, the thyristors 114*a*, 114*b*, and 114*c* transition from the conductive state to the non-conductive state in a period where the output voltage Vu of the U-phase of the AC generator A is reverse in polarity to the output voltage Vu at the time of being supplied to the battery B. In other words, the thyristors 114*a*, 114*b*, and 114*c* are turned off in a period where the current supplied from the AC generator A to the battery B becomes substantially zero.

In the example of FIG. 2, in the period from time t2 to time t3, the output voltage Vu of the U-phase of the AC generator A becomes a negative voltage which is reverse in polarity to the so-far output voltage, so that the current Isu of the U-phase flowing through the thyristor 114*a* becomes approximately zero (minimum). The thyristor 114*a* is turned off in the period from time t2 to time t3 where the output voltage Vu of the AC generator A is reverse in polarity. Here, when the output voltage Vu of the U-phase of the AC generator A becomes equal to or less than zero, the current Isu flowing through the thyristor 114*a* becomes substantially zero, so that the thyristor 114*a* is turned off. Strictly speaking, if the forward current flowing through the thyristor 114*a* becomes less than the holding current of the thyristor 114*a*, the thyristor 114*a* is turned off. Accordingly, in the present embodiment, the period in which the output voltage Vu of the AC generator A is reverse in polarity (negative voltage) includes a period in which the forward current flowing through the thyristor 114*a* becomes less than the holding current of the thyristor 114*a*.

Additionally, when the output voltage Vu of the U-phase of the AC generator A becomes a negative voltage, the thyristor 114*a* is reverse biased, so that the current Isu flowing through the thyristor 114*a* is maintained at substantially zero. For this reason, there is substantially no change in current on the U-phase line when the thyristor 114*a* is turned off, thereby suppressing the occurrence of a surge due to inductive component of the U-phase line. The same applies to the V-phase and the W-phase.

As described above, when the battery voltage of the battery B is decreased in the stationary state, the thyristors 114a, 114b, and 114c are turned off in a state where the current Isu, Isv, and Isw flowing through the thyristors 114a, 114b, and 114c are substantially zero. Therefore, according to the power conversion device 100, it is possible to electrically disconnect the battery B from the outputs of the AC generator A while suppressing the occurrence of a surge due to the inductive components of the respective phase lines, and thereby to preferentially ensure the power supply to the electronic control unit E.

(D) Operation when Electrode Connector of Battery is Detached

There might arise a case where during the operation of the engine in the system to which the power conversion device apparatus 100 is applied, the electrode connector of the battery B is unintentionally detached due to, for example, mechanical vibration or the like. In this case, if a load (not shown), such as an electrical equipment that operates using the battery B as the power supply, is in a state of being electrically connected between the output terminal 162 and the common terminal 166 of the power conversion device 100, the output voltage Vout2 is decreased by the current flowing through the load (not shown).

When the output voltage Vout2 is decreased to the predetermined threshold value VTH or less, the low voltage protection circuit 140 detects the decrease in output voltage Vout2, and outputs a signal SR indicating that fact. In response to this signal SR, the driver circuit 130 turns off the thyristors 114a, 114b, and 114c. Thereby, the output voltage Vout2 is no longer generated. In other words, when the electrode connector of the battery B is detached, the output voltage Vout2 for charging the battery B is no longer generated. Accordingly, when the electrode connector of the battery B is detached, a case where an unnecessary output voltage Vout2 is generated no longer occurs.

In contrast, even when the electrode connector of the battery B is detached, the AC outputs of the AC generator A are rectified by the diodes 111a, 111b, and 111c, so that the output voltage Vout1 is generated. The output voltage Vout1 charges the electrolytic capacitor C to a constant voltage. Thereby, when the electrode terminal of the battery B is detached, the electrolytic capacitor C functions as a power supply to the electronic control unit E. Accordingly, even when the electrode connector of the battery B is detached during the operation of the engine, it does not affect the operation of the electronic control unit E, thereby making it possible to continue the control of the engine by the electronic control unit E.

(E) Operation when no Battery is Mounted

In a case where the system to which the power conversion device 100 is applied is not mounted with the battery B (in the battery-less case), there is no supply source of dark current of the electronic control unit E, so that the dark current of the electronic control unit E is never generated.

Additionally, in the case where the battery B is not mounted, start-up of the engine can be performed by manual cranking, such as a recoil starter, in place of the starter motor M. In this case, when the engine is cranked, the AC generator A initiates power generation. The outputs of the AC generator A are rectified by the power supply voltage generation circuit 120, so that the power supply to the driver circuit 130 and the low voltage protection circuit 140 are generated. Thereby, the driver circuit 130 and the low voltage protection circuit 140 become operable, so that the power conversion device 100 becomes operable.

Thus, even in the case where the system to which the power conversion device 100 is applied is mounted with no battery B, similarly to the case where the electrode connector of the above-described battery B is detached, when the output voltage Vout2 is decreased to the predetermined threshold value VTH or less, the low voltage protection circuit 140 detects the decrease in output voltage Vout2, and outputs a signal SR indicating that fact. In response to this signal SR, the driver circuit 130 turns off the thyristors 114a, 114b, and 114c. Thereby, the output voltage Vout2 is no longer generated.

Additionally, even in the case where no battery B is mounted on the system to which the power conversion device 100 is applied, the AC outputs of the AC generator the A are full-wave rectified by the diodes 111a, 111b, 111c and the diodes 112a, 112b, 112c, so that the output voltage Vout1 is generated. The output voltage Vout1 charges the electrolytic capacitor C to a constant voltage. Thereby, the electrolytic capacitor C functions as a power supply to the electronic control unit E. Accordingly, even in the case where the system is mounted with no battery B, it is possible to secure the power supply to the electronic control unit E, start the engine by a recoil starter or the like, and thereby control the operation of the engine by the electronic control unit E.

Second Embodiment

Next, a second embodiment of the present invention will be described.

Figure 3:
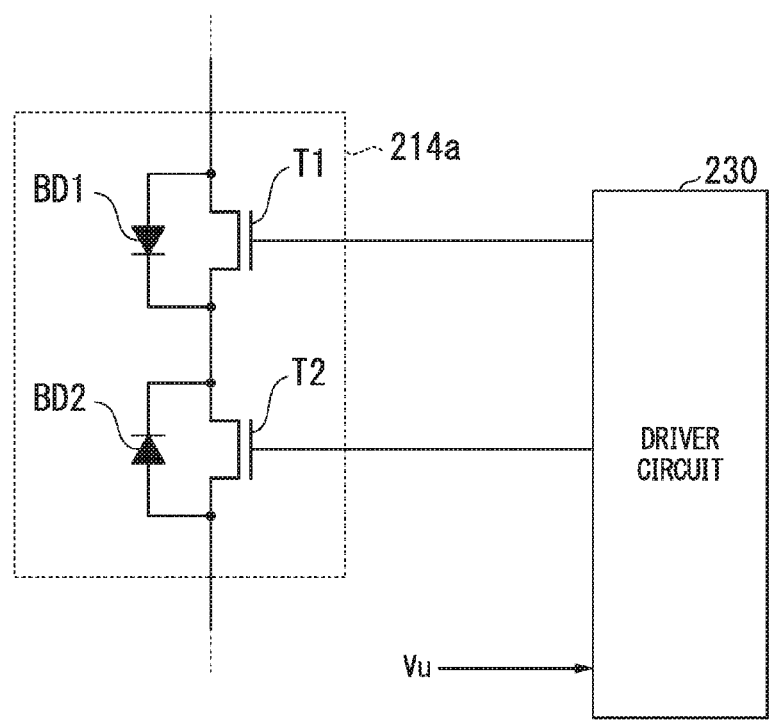
FIG. 3 is a circuit diagram showing a configuration example of a characteristic portion of a power conversion device according to a second embodiment of the present invention.

FIG. 3 is a circuit diagram showing a configuration example of a characteristic portion of a power conversion device according to the second embodiment of the present invention.

The power conversion device according to the second embodiment has the above-described configuration of the power conversion device 100 shown in FIG. 1 according to the first embodiment, except that a switch circuit 214a shown in FIG. 3 is provided in place of the thyristor 114a, and a switch circuit having the same configuration as that of the switch circuit 214a is provided in place of the thyristors 114b and 114c. Additionally, the power conversion device according to the second embodiment has the configuration of the power conversion device 100 shown in FIG. 1, except that a driver circuit 230 for driving the switch circuit 214a is included in place of the driver circuit 130. In the example of FIG. 3, only a configuration corresponding to the U-phase of the AC generator A is representatively shown, while configurations corresponding to the V-phase and the W-phase are omitted.

As shown in FIG. 3, the switch circuit 214a includes an N-channel type field effect transistor T1 and an N-channel type field effect transistor T2. A source of the field effect transistor T1 is connected to the output terminal 162 shown in FIG. 1. A drain of the field effect transistor T2 is connected to a drain of the field effect transistor T1. A source of the field effect transistor T2 is connected to the input terminal 163 shown in FIG. 1.

Body diodes BD1 and BD2 are connected respectively to the field effect transistors T1 and T2. In other words, an anode and a cathode of the body diode BD1 are connected respectively to the source and the drain of the field effect transistor T1. Additionally, an anode and a cathode of the body diode BD2 are connected respectively to the source and the drain of the field effect transistor T2.

The switch circuits provided in place of the thyristors 114b and 114c have the same configuration as that of the switch circuit 214a provided in place of the above-described thyristor 114a. Additionally, the others have the same configuration as those of the first embodiment.

In the second embodiment, the driver circuit 230 detects the output voltage Vu of the U-phase of the AC generator A, and turns off the field effect transistors T1 and T2 at the timing at which the output voltage Vu becomes substantially zero volts while transitioning from positive to negative. In other words, the driver circuit 230 turns off the field effect transistors T1 and T2 at the timing at which the output current Iu of the U-phase becomes substantially zero amperes. Thereby, when the switch circuit 214a including the field effect transistors T1 and T2 is turn off, the current flowing through the switch circuit 214a is substantially zero amperes, so that there is substantially no change in current due to the turn-off of the switch circuit 214a. For this reason, occurrence of a surge is suppressed similarly to the above-described first embodiment.

Third Embodiment

Next, a third embodiment of the present invention will be described.

Figure 4:
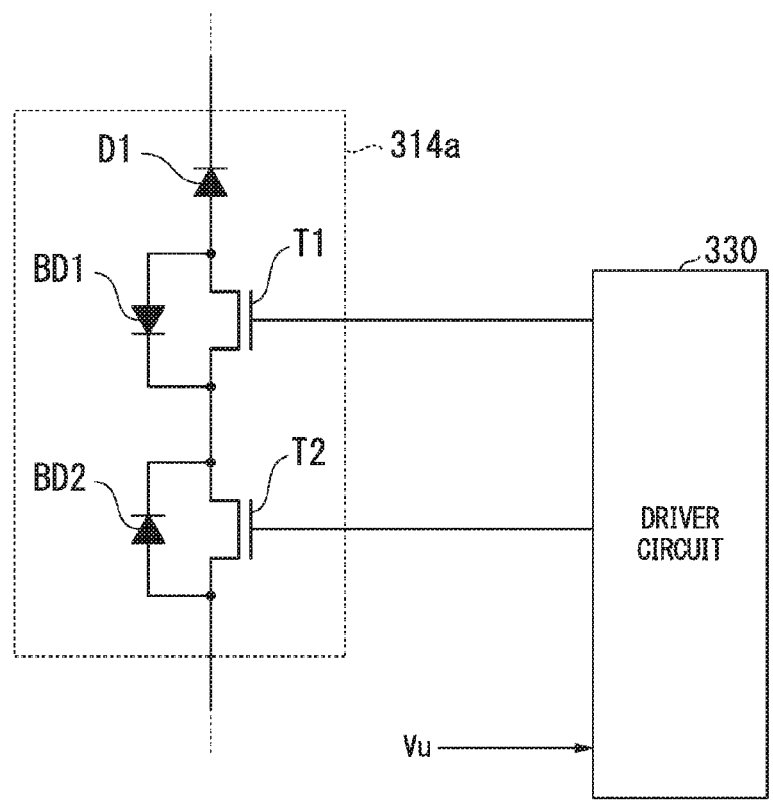
FIG. 4 is a circuit diagram showing a configuration example of a characteristic portion of a power conversion device according to a third embodiment of the present invention.
Figure 5:
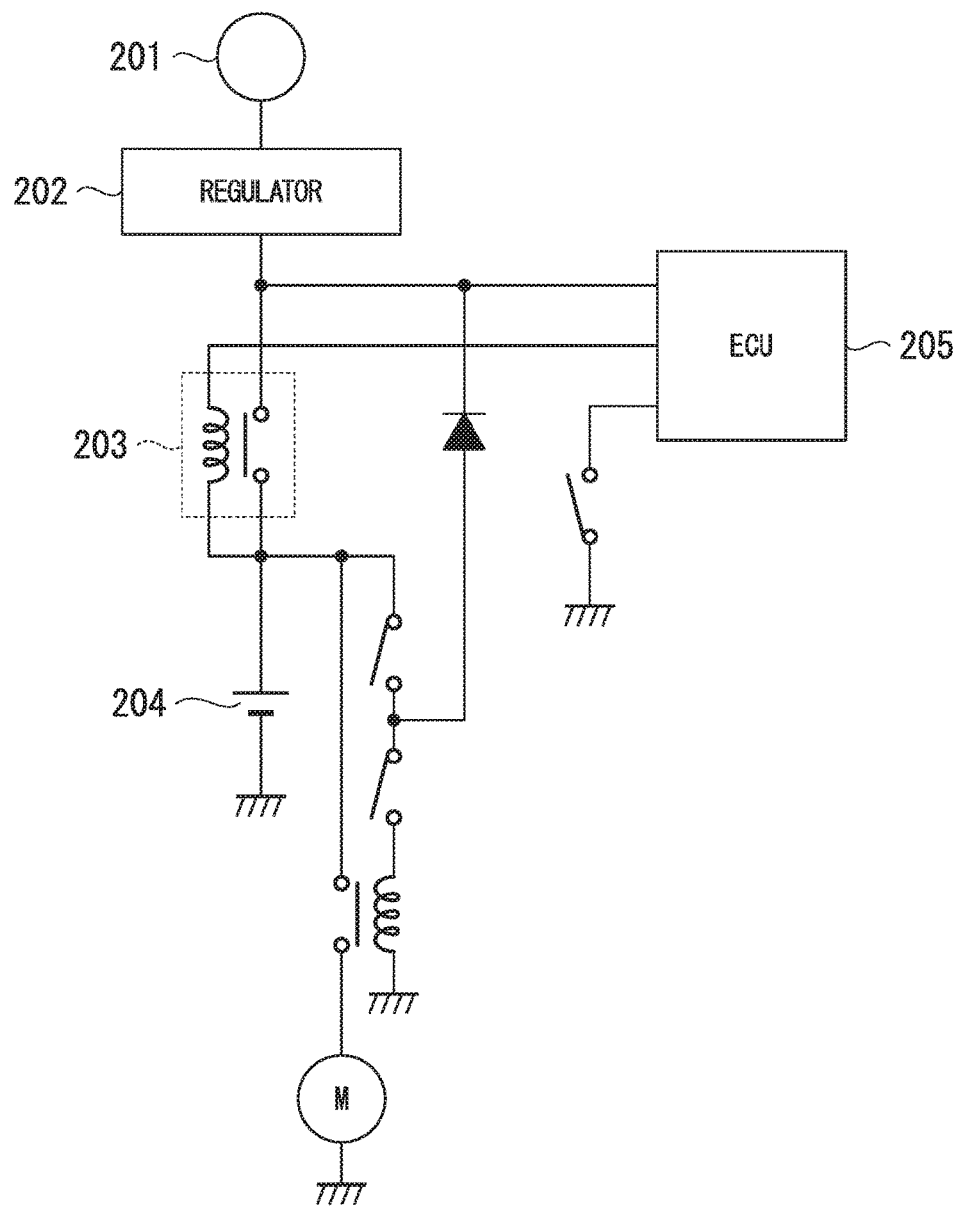
FIG. 5 is a diagram for explaining a conventional device.

FIG. 4 is a circuit diagram showing a configuration example of a characteristic portion of the power conversion device according to the third embodiment of the present invention.

The power conversion device according to the third embodiment has the same configuration as that of the above-described power conversion device 100 shown in FIG. 1 according to the first embodiment, except that a switch circuit 314a shown in FIG. 4 is provided instead of the thyristor 114a, and a switch circuit having the same configuration as that of the switch circuit 314a is provided in place of the thyristors 114b and 114c. Additionally, the power conversion device according to the third embodiment has the same configuration as that of the above-described power conversion device 100 shown in FIG. 1, except that a driver circuit 330 for driving the switch circuit 314a is provided in place of the driver circuit 130. In the example of FIG. 4, only a configuration corresponding to the U-phase of the AC generator A is representatively shown, while configurations corresponding to the V-phase and W-phase are omitted.

The switch circuit 314a has the same configuration as that of the above-described switch circuit 214a of the second embodiment, except that a diode D1 is provided.

In other words, as shown in FIG. 4, the switch circuit 314a includes a diode D1, an N-channel type field effect transistor T1, and an N-channel type field effect transistor T2. A cathode of the diode D1 is connected to the output terminal 162 shown in FIG. 1, while an anode of the diode D1 is connected to a source of the field effect transistor T1. A drain of the field effect transistor T2 is connected to a drain of the field effect transistor T1. A source of the field effect transistor T2 is connected to the input terminal 163 shown in FIG. 1.

Body diodes BD1 and BD2 are connected respectively to the field effect transistors T1 and T2. In other words, an anode and a cathode of the body diode BD1 are connected respectively to the source and the drain of the field effect transistor T1. Additionally, an anode and a cathode of the body diode BD2 are connected respectively to the source and the drain of the field effect transistor T2.

The switch circuits provided in place of the thyristors 114b and 114c have the same configuration as that of the switch circuit 314a provided in place of the above-described thyristor 114a. Additionally, the others have the same configuration as those of the first embodiment.

In the third embodiment, the driver circuit 330 detects the output voltage Vu of the U-phase of the AC generator A, and turns off the field effect transistors T1 and T2 in a period in which the output voltage Vu is negative in polarity. Here, since the diode D1 is reverse-biased in the period in which the output voltage Vu is negative in polarity, no current flows through the diode D1. This means that no current flows through the field effect transistors T1 and T2 connected in series to the diode D1. Thereby, there occurs substantially no change in current due to the turn-off of the switching circuit 314a. For this reason, occurrence of a surge can be suppressed similarly to the above-described first and second embodiments.

According to the third embodiment, in a period in which the output voltage Vout2 is negative in polarity, the diode D1 is reverse biased, substantially no current flows through the switching circuit 314a. For this reason, a surge does not occur even if the field effect transistors T1 and T2 are turned off at any timing during the period in which the output voltage Vu is negative in polarity. Therefore, in comparison with the second embodiment, since there is no need to identify the timing (so-called zero-cross point) at which the output voltage Vu becomes zero, it is possible to have a margin in timing of turning off the switching circuit 314a.

Although the embodiments of the present invention have been described above, the present invention is not limited to the embodiments described above, and various modifications and applications may be made within the scope of the present invention.

For example, although it has been assumed in the above-described embodiments that the three phases of the U-phase, the V-phase, and the W-phase of the AC generator A are rectified, any one or two of the phases may be rectified.

Additionally, although the full-wave rectifier circuit 110 has been configured in the above embodiments as a full-wave rectifier circuit of short-control type, the above embodiments are not limited to this example, and the circuit type is optional.

DESCRIPTION OF REFERENCE NUMERALS

100 . . . power conversion device
110 . . . rectifier circuit
111a, 111b, 111c, 112a, 112b, 112c . . . diode
113a, 113b, 113c, 114a, 114b, 114c . . . thyristor
120 . . . power supply voltage generation circuit
130 . . . driver circuit
140 . . . low voltage protection circuit
150 . . . output voltage control circuit
161, 162 . . . output terminal
163, 164, 165 . . . input terminal
166 . . . common terminal
A . . . AC generator
B . . . battery
C . . . electrolytic capacitor
D, D1 . . . diode
E . . . electronic control unit (ECU)
F . . . fuse
M . . . starter motor
S . . . starter switch

The invention claimed is:

1. A power conversion device configured to convert an output of an AC generator into a desired DC power and supply the desired DC power to a first load and a second load, the power conversion device comprising:
a first rectifier circuit connected in series to the first load, the first rectifier circuit including at least one pair of diodes, an output portion of the AC generator being connected between each pair of diodes, the first rectifier circuit being configured to rectify the output of the AC generator and supply the rectified output to the first load;

a second rectifier circuit connected in series to the second load, the second rectifier circuit including at least one pair thyristors, anodes of each pair of thyristors being connected in series to each other, the output portion of the AC generator being connected between each pair of thyristors, one of each pair of thyristors being configured to, by entering a conductive state, rectify the output of the AC generator and supply the rectified output to the second load, and an other one of each pair of thyristors being configured to, by entering a conductive state, supply the output of the AC generator in a direction reverse to a direction from a cathode of the one of each pair of thyristors toward the second load;

an output voltage control circuit configured in parallel to the first rectifier circuit, the output voltage control circuit being configured to control the other one of each pair of thyristors so that an output voltage of the first rectifier circuit becomes a desired voltage, wherein as a result of that the output voltage of the first rectifier circuit becomes the desired voltage an output voltage of the second rectifier circuit also becomes a desired voltage.

2. The power conversion device according to claim 1, wherein the one of each pair of thyristors is configured to transition from the conductive state to the non-conductive state in a period in which the output of the AC generator is reverse in polarity to that at the time of being supplied to the second load.

3. The power conversion device according to claim 1, wherein the one of each pair of thyristors is a thyristor connected between the AC generator and the second load so that forward current flows from the AC generator towards the second load.

4. The power conversion device according to claim 1, wherein the first load is an electronic control unit configured to control rotation of an engine, and the second load is a battery configured to provide a power supply to the electronic control unit.

* * * * *